United States Patent [19]
Kurtz et al.

[11] 4,204,185
[45] May 20, 1980

[54] INTEGRAL TRANSDUCER ASSEMBLIES EMPLOYING THIN HOMOGENEOUS DIAPHRAGMS

[75] Inventors: Anthony D. Kurtz, Englewood; Richard A. Weber, Denville, both of N.J.

[73] Assignee: Kulite Semiconductor Products, Inc., Ridgefield, N.J.

[21] Appl. No.: 841,679

[22] Filed: Oct. 13, 1977

[51] Int. Cl.² ............................................. G01L 1/22
[52] U.S. Cl. .................................. 338/4; 29/610 SG; 357/26
[58] Field of Search .................. 338/2, 4, 5, 3, 42; 357/26; 29/610 SG, 580; 73/88.5 SD

[56] References Cited

U.S. PATENT DOCUMENTS

| | | | |
|---|---|---|---|
| 3,853,650 | 12/1974 | Hartlaub | 357/26 X |
| 3,858,150 | 12/1974 | Gurtler et al. | 338/2 |

Primary Examiner—C. L. Albritton
Attorney, Agent, or Firm—Arthur L. Plevy

[57] ABSTRACT

A pressure transducer is formed on an N-type wafer of silicon by depositing on the wafer a P+ layer. A thin N-type layer is then formed on the P+ layer. The N layer which is relatively thin, will form a diaphragm for piezoresistors which are deposited on the N layer. The P+ layer acts as a stop to enable a central aperture to be formed or etched into the N wafer; which aperture defines an active deflecting area for the thin N-type diaphragm. The various layers are crystallographically homogeneous to enable the piezoresistors to exhibit high coefficients and hence, provide a sensitive transducer assembly.

6 Claims, 6 Drawing Figures

INTEGRAL TRANSDUCER ASSEMBLIES EMPLOYING THIN HOMOGENEOUS DIAPHRAGMS

BACKGROUND OF INVENTION

This invention relates to transducers employed to transform mechanical forces into an electrical signal indicative of the magnitude of an applied mechanical force or stress. Particularly, this invention relates to a method and structure enabling the fabrication of a transducer employing small and thin diaphragms while maintaining large piezoresistive coefficients in regard to the sensors deposited or otherwise employed on such diaphragms.

The use of piezoresistive transducers in conjunction with semiconductor diaphragms of all types is quite well documented in the prior art. Essentially, the art has progressed to the point where the piezoresistive transducer is a relatively reliable and economical component and is widely used to measure stress and motion in a plurality of different applications.

In any event, a major desire in the fabrication and formulation of such transducers is to achieve further economical advantages while maintaining sensitivity and reliability which are associated with such units. Essentially, an object of the prior art and of the transducer technology is to provide an economical transducer assembly which possesses good electrical characteristics and sensitivity while maintaining relatively small diaphragm size and which assembly is capable of being produced in large quantities employing conventional mass production integrated circuit techniques. Hence, there exists a number of patents in the prior art which attempt to provide a transducer structure according to the above considerations.

If reference is made to U.S. Pat. No. 3,800,264 entitled HIGH TEMPERATURE TRANSDUCERS AND HOUSINGS INCLUDING FABRICATION METHODS which issued on Mar. 26, 1974 to the Assignee herein, there is shown a dielectrically isolated transducer which employs a silicon diaphragm. The diaphragm has a piezoresistive sensor mounted on a dielectric insulator which in essence, provides isolation of the sensor from the diaphragm while further providing a high temperature bonding to a suitable housing. The structure depicted in that patent is further shown in U.S. Pat. No. 3,930,823 regarding methods of fabricating such units. Essentially, the devices depicted in the above noted patents employ small diameter diaphragms which are useful for high temperature environments and are relatively economical and reliable.

Other techniques concerned with problems of mass production and reliability are shown in U.S. Pat. No. 3,858,150 entitled POLYCRYSTALLINE SILICON PRESSURE SENSORS issued on Dec. 31, 1974. This patent describes a piezoresistive sensor which is formed in polycrystalline silicon layer. The silicon layer is deposited on an insulating etch stop layer of silicon nitride which in turn is deposited over a substrate of monocrystalline silicon. The substrate is configured to support the silicon nitride layer by etching away its inner section and leaving a peripheral section. The piezoresistive sensors are diffused into the polycrystalline layer and are located over an area that is ultimately flexible and generally designated as the active area of the diaphragm. While the technique lends itself to mass produced components, there are certain disadvantages regarding this technique. Essentially, the polycrystalline layer serves to reduce the piezoresistive coefficients of the diffused sensor elements and hence, the device employing a polycrystalline silicon layer is not as sensitive as those devices which employ a homogeneous diaphragm. In polycrystalline silicon, the grains of the silicon are randomly oriented and hence the sensors which are deposited within such a layer exhibit a lower piezoresistive coefficient which is determined by the average value of the grain orientation in the crystallographic plane. It is, of course, understood and known that the gage factor of the sensor which is defined as the fractional change in resistance per unit strain, is also a function of the piezoresistive coefficient of the sensor. Hence, the higher the piezoresistive coefficient is, the more sensitive the final transducer. Furthermore, by employing a sensor with high piezoresistive coefficients, one can fabricate smaller diaphragms while maintaining reliability and optimum operating characteristics.

It is therefore an object of the present invention to provide an improved transducer structure adapted to mass production techniques while providing reliable operating characteristics by employing piezoresistive sensors having relatively high piezoresistive coefficients.

BRIEF DESCRIPTION OF PREFERRED EMBODIMENT

A pressure transducer comprising an annular base member fabricated from a semiconductor material of a given conductivity, said annular member having a central aperture defining an active area; which aperture is characterized as being formed by a chemical capable of selectively etching said given conductivity semiconductor, a composite layer covering said aperture and comprising a first cover layer immediately above said aperture and fabricated from a highly doped opposite conductivity layer, a second thicker layer deposited on said first layer and fabricated from a semiconductor material of the same conductivity as said base member, and at least one piezoresistive sensor element deposited on said second layer and within the area overlying said aperture whereby upon deflection of said composite layer, said element exhibits a resistance according to the magnitude of said deflection.

DETAILED DESCRIPTION OF FIGURES

Figure 1:
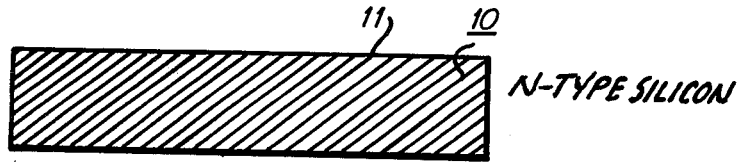
FIGS. 1 to 5 are cross-sectional views depicting the various steps in the process of forming the transducer according to the invention.

Referring to FIG. 1, there is shown a wafer of N-type silicon which is oriented along a preferable crystallographic plane such as the [110] plane. The wafer of N-type silicon may be between three to fifty mils thick and preferably may be polished on the top surface 11.

The wafer 10 then has grown, diffused, or implanted on the surface 11, a relatively thin layer of a P+ conductivity layer. P+ semiconductor layers which are diffused or otherwise deposited are well known in the art and the conductivity of the P+ layer depends upon the type of dopant material used. The P+ layer 12 which may be diffused or epitaxially grown on the N-type substrate is relatively thin and may be on the order of one or more microns.

Figure 2:
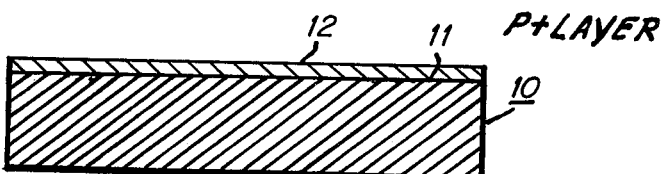

In any event, the P+ layer when grown or diffused, is in crystallographic orientation with the N-type silicon wafer 10 and hence, is homogeneous in regard to crystalline structure of the N-type wafer 10. This step in the procedure is shown in FIG. 2 which specifies an N-type wafer 10 having deposited thereon a P+ layer 12.

Figure 3:
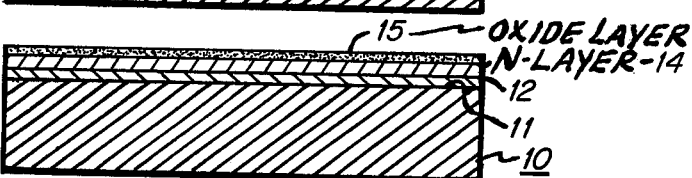

Referring to FIG. 3, a thin layer of an N-type semiconductor is then deposited or grown on the P+ layer. In essence, the N− layer 14 is a low conductivity layer as compared to P+ layer 12. This N− layer may be grown to a depth on the order of a few tenths of a mil and in essence, comprises the diaphragm section of the transducer to be formed.

It is noted at this point that the N-type diaphragm layer 14 is extremely thin and its thickness can be accurately controlled which therefore results in higher transducer yields while requiring less testing and handling due to the fact that the deposition of the N-type layer which may be accommodated by an epitaxial technique, can be grown in a controlled environment at a relatively slow rate.

Referring to FIG. 3, an oxide layer 15 is then grown on the N-type layer 14. Growth of oxide layers are well known in the art and can be provided by heating the composite structure of FIG. 3 to a temperature between 1,000 to 1,300 degrees C. and passing oxygen over the surface.

Figure 4:
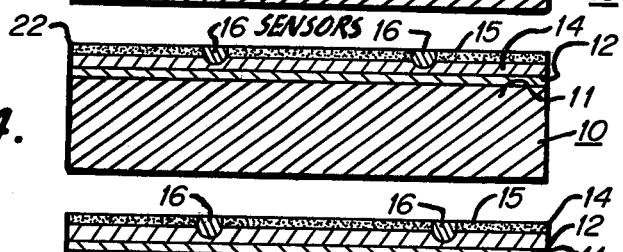

Referring to FIG. 4, a bridge pattern 16 is then diffused into the N-type layer 14 via windows which are selectively formed in the oxide layer 15. Essentially, the formation of the sensor bridge assembly 16 is accommodated by the use of photomasks and photochemical procedures.

Briefly, the use of such techniques are well known in the semiconductor art and involve the formation of a photoresisting lacquer which is coated over the oxide layer. The thickness of the photoresist may be on the order of several thousand angstroms.

A photomask having a desired pattern impressed upon it is then exposed to ultraviolet light which causes the photoresist to harden according to the pattern on the mask. The areas of the mask which do not contain a pattern cause the photoresist to remain soft and the soft portions are removed by a chemical etchant. Hence, a pattern 16 is formed in the oxide without affecting the N− layer 14.

Figure 6:
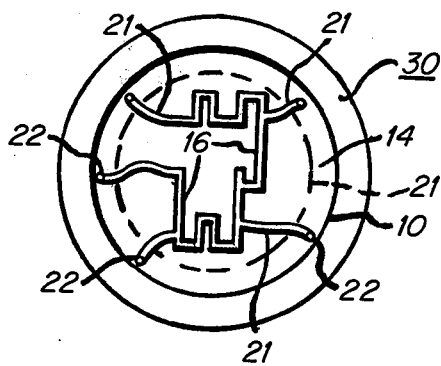
FIG. 6 is a top plan view of a transducer according to FIG. 5 and implemented according to the methods described.

At this point, the piezoresistive elements are diffused into the N-type layer to thereby provide piezoresistive elements according to the bridge pattern and as shown in the top view of FIG. 6.

It is now noted that due to the above techniques, all the layers as the P+ layer 12 and the N− layer 15 are homogeneous with the N-type layer 10. Thus, these layers assume the same crystallographic orientation as that of the original N-type silicon and hence, the piezoresistors which are diffused into the N-type layer exhibit a piezoresistive coefficient which is extremely high as being determined by a homogeneous N-type layer.

Figure 5:
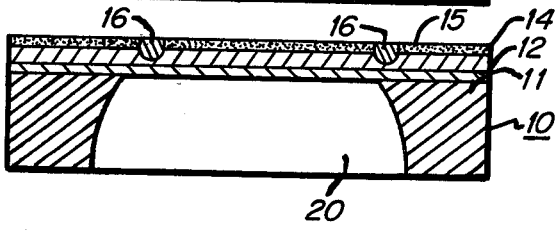

Referring to FIG. 5, a central aperture 20 is then formed in the N-type wafer 10 and defines the active area of the diaphragm. The aperture 20 is formed by a photoresist technique and an etchant as hydrazine is employed to etch the aperture 20 as determined by the mask employed on the bottom surface of the wafer 10.

The hydrazine will not affect the P+ layer and hence, the etching process stops at the P+ layer.

Referring to FIG. 6, there is shown a top view of the completed transducer assembly in FIG. 5. Essentially, the transducer is shown as a circular configuration, but it is understood that any other configuration could be employed by the techniques described above.

Essentially, the transducer comprises an annular base member 10 which is fabricated from N-type silicon. The base member 10 has a central aperture shown in dashed line 20 formed by the etching process. Overlaying the aperture 20 is a thin N-type diaphragm 21 having deposited on the surface thereof, a piezoresistive bridge pattern 16 which may be a four-arm Wheatstone bridge. Shown directed from the bridge pattern 16 is a series of contact or terminal areas 21 which can be implemented during the above noted procedure by the use of an appropriate photoresist and deposition technique. It is seen that the leads are directed towards the periphery of the thin N-type diaphragm 14 and terminals as 22 are located on the inactive area of the diaphragm which underlies the annular housing or member 10.

It is, of course, understood from the above noted description that the conductivity of the various layers described can be varied and different etching materials employed to accommodate the structure shown. Thus, for example, N+ can be substituted for P+ and P materials substituted for N materials. The techniques employing complimentary semiconductor layers are known in the art.

In summation, there has been provided a transducer which can be accurately and reliably formed in great quantities; which transducer employs extremely thin diaphragms of a relatively homogeneous crystallographic orientation to enable the diffusion of piezoresistive sensing elements into the diaphragm; which elements exhibit high coefficient to therefore impart superior electrical characteristics and sensitivity to the resultant transducer.

The transducers described are integrally formed and hence possess relatively uniform characteristics as a plurality of such units can be implemented by a single process on a large wafer of N-type silicon 10 and each individual transducer unit as shown in FIG. 6 can then be scribed or otherwise removed from the large wafer. The technique avoids the use or the formation of a polycrystalline material; which material if employed, undesirably reduces the piezoresistive coefficients of the sensors deposited thereon. While a bridge arrangement has been shown in FIG. 6, it is understood that a single piezoresistive element could be deposited in lieu of a bridge by employing the above noted techniques.

It would thus be obvious to one skilled in the art that any number of piezoresistive sensors in any one of a plurality of different configurations could be employed with the present invention without departing from the spirit and scope of the same.

We claim:

1. A transducer, comprising:
   (a) an annular base member fabricated from a semiconductor material of a given conductivity, said annular member having a central aperture defining an active area; which aperture is characterized as being formed by a chemical capable of selectively etching said given conductivity semiconductor,
   (b) a composite layer covering said aperture and comprising a first cover layer immediately above said aperture and fabricated from a highly doped conductivity layer, a second thicker layer located on said first layer and fabricated from a semiconductor material, and (c) at least one piezoresistive sensor element deposited on said second layer and within the area overlying said aperture whereby upon deflection of said composite layer, said element exhibits a resistance according to the magnitude of said deflection.

2. The transducer according to claim 1 wherein said base member is fabricated from N-type silicon having a predetermined crystallographic orientation and capable of being etched by hydrazine.

3. The transducer according to claim 2 wherein said composite layer comprises a first thin semiconductor layer of a P+ conductivity and a second thicker semiconductor layer of an N-type conductivity.

4. The transducer according to claim 3 wherein said composite layer is between 0.1 and 0.5 mils thick.

5. The transducer according to claim 3 wherein said P+ layer and said N− layer are homogeneous with respect to said crystallographic orientation of said base member.

6. The transducer according to claim 5 wherein said piezoresistive element has a piezoresistive coefficient mainly dependent upon the crystallographic orientation of said N− layer.

* * * * *